United States Patent Office 3,203,939
Patented Aug. 31, 1965

3,203,939
UNSATURATED EPOXIDES AND METHOD FOR MAKING SAME
Samuel W. Tinsley, Jr., and Edward A. Rick, South Charleston, W. Va., assignors to Union Carbide Corporation, a corporation of New York
No Drawing. Filed Feb. 8, 1962, Ser. No. 171,814
18 Claims. (Cl. 260—88.1)

This invention relates to a novel process for preparing unsaturated epoxides, and to the unsaturated epoxides obtained thereby. In particular, this invention relates to organic compounds containing a polymerizable unsaturated group, e.g., a vinyl group, and an epoxy group comprising oxygen bonded to two vicinal carbon atoms. In various other aspects the invention relates to novel polymers obtained by polymerizing the novel unsaturated epoxides of this invention through the polymerizable unsaturated groups thereof and/or through the epoxy groups thereof.

The polymerizable unsaturated epoxides made by this invention are well suited for use in resin-forming operations, such as coating, laminating, bonding, molding, casting, potting, and the like. They are self-polymerizable and also co-polymerizable with various other organic materials such as other polymerizable unsaturated organic compounds, other epoxides, and the well-known active organic hardeners, e.g., polycarboxylic acids (including the polycarboxy polyesters), polycarboxylic acid anhydrides, polyols, polythiols, polyisocyanates, polyacyl halides, and the like. Compositions containing the compounds produced by this invention, with or without co-polymerizable materials as set forth above and/or special additives for producing special effects, are compatible with solid materials such as fillers and pigments for providing various effects in physical properties and coloration. With or without such added solid materials, these polymerizable compositions can be made to fill small intricacies of molds without the necessity of applying high pressures and heating to high temperatures, although such measures can be employed if desired. The polymerizable compositions also can be easily spread, brushed, or sprayed by many techniques available in the point, lacquer, and varnish industries for making coatings and finishes. Negligible shrinkage, if any, occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The polymerizable compositions described above also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

The novel process of this invention comprises the etherification of a vic-epoxyalkanol or a vic-epoxyalicyclic alcohol with a vinyl ether or a vinyl ester wherein the vic-epoxy group is connected through at least one carbon atom to the alcoholic hydroxyl group in the presence of the mercuric salt of a weak acid, preferably a mercuric alkanoate. It has been unexpectedly found that such an etherification in the presence of the mercuric salt of a weak acid is accomplished without substantial destruction of the epoxide ring and results in high yields of vinyl vic-epoxyalkyl ethers or vinyl vic-epoxyalicyclic ethers. The term "vic-epoxy," as employed herein, refers to an oxirane oxygen connected to vicinal carbon atoms, e.g.,

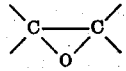

The term "vic-epoxyalicyclic," as employed herein, includes vic-epoxymonocycloalkyls, e.g., 2,3-epoxycyclopentyl, and vic-epoxypolycycloalkyls, e.g., 4-oxatetracyclo[6.2.1.0$^{2,7}$.0$^{3,5}$]undec-9(10) - yl, and alkyl-substituted and aryl-substituted derivatives thereof. Any suitable temperatures which will effect the etherification can be employed. Illustrative temperatures generally lie in the range of 25° C., and lower, to 150° C., and higher.

The etherification reaction involved in the novel process is reversible. Once equilibrium has been established, the catalyst is destroyed, and the desired vinyl vic-epoxyalkyl ether or vic-epoxyalicyclic ether is separated and recovered by suitable means, such as fractional distillation. It is particularly advantageous, however, to force the reaction to completion by continuously removing the desired vinyl vic-epoxyalkyl ether or vic-epoxyalicyclic ether from the reaction mixture. This can frequently be accomplished by selectively distilling the vinyl vic-epoxyalkyl ether or vic-epoxyalicyclic ether from the reaction mixture, since these, in general, boil at a sufficiently lower temperature than the corresponding alcohols from which they are derived.

While mercuric acetate is the preferred catalyst, other mercuric salts of weak acids can be employed. Suitable catalysts illustratively include mercuric oxalate, mercuric citrate, mercuric linoleate, mercuric propionate, mercuric butyrate, mercuric chromate, and the like. Mercuric alkanoates are particularly effective as catalysts for these etherifications. Mercuric salts of strong acids are suitable catalysts only when they do not preferentially catalyze the formation of acetals or catalyze the decomposition of the vic-epoxide.

Vinyl ethers and vinyl esters which can be employed as reactants (vinylating agents) in the etherification process of this invention are any of the vinyl organic ethers and vinyl organic esters which do not otherwise react with 1,2-epoxy groups or alcoholic hydroxyl groups, such as those in the vic-epoxyalkanol or the vic-epoxyalicyclic alcohol reactants, under the conditions of said process. The preferred vinylating agents are the vinyl alkyl ethers, such as vinyl n-butyl ether, vinyl 2-ethylhexyl ether, vinyl n-octyl ether, vinyl 2-butoxyethyl ether, and the like, and the vinyl alkanoates, such as, vinyl acetate, vinyl butyrate, vinyl hexanoate, and the like.

The vic-epoxyalkanols and the vic-epoxyalicyclic alcohols employed as reactants in this process include glycidol, 2,3 - epoxycyclopentanol, 4-oxatetracyclo[6.2.1.0$^{2,7}$.0$^{3,5}$]undecan-9(or 10)-ol, 2,3-epoxybutanol, 2-methyl-2,3-epoxypropanol, 2-methyl-2,3-epoxybutanol, 2,3-epoxypentanol, 2,3-epoxyhexanol, 2,3-epoxyoctanol, 10,11-epoxyundecanol, 9,10-epoxydecanol, 9,10-epoxyoctadecanol, 4-methyl-2,3-epoxycyclopentanol, 4-isopropyl-2,3-epoxycyclopentanol, 3,4-epoxycyclohexanol, 3-ethyl-3,4-epoxycyclohexanol, 4-methyl-2,3-epoxycyclohexanol, 6-n-butyl-3,4-epoxycyclohexanol, 5-amyl - 3,4- epoxycyclohexanol, 2,4-diethyl-3,4 - epoxycyclohexanol, 3,4-epoxycycloheptanol, 2,3-epoxycycloheptanol, 2,3-epoxycyclohexanol, 2,3-epoxycyclooctanol, 2,3-epoxycyclopentylmethanol, 3,4-epoxycyclohexylmethanol, 2-n-propyl-3,4-epoxycyclohexylmethanol, 5-ethyl-3,4-epoxycyclohexylpropanol, 3,4-epoxycyclohexylamyl alcohol, 2,3-epoxycycloheptylmethanol, 3-oxatricyclo[3.2.1.0$^{2,4}$]octan-6-ol, lower alkyl substituted-3-oxatricyclo[3.2.1.0$^{2,4}$]octan-6-ol, lower alkyl substituted - 4 - oxatetracyclo[6.2.1.0$^{2,7}$.0$^{3,5}$]undecan-9(or 10)-ol, and the like. As employed herein, the term lower alkyl designates an alkyl group having from 1 to 4 carbon atoms.

The vic-epoxyalkanols and the vic-epoxyalicyclic alcohols are, for the most part, known in the prior art. However, they can be prepared by reacting the corresponding alkenols and olefinically unsaturated alicyclic alcohols, e.g., mono- and poly- cycloalkenols, with an aliphatic peracid, such as peracetic acid, as a 10 to 50 weight percent solution in an inert organic solvent at a temperature in the range of about 0° C., or lower, to about 100° C. The amount of peracetic acid employed should be at least one mole per mole of the carbon to carbon double bond of the alkenol or mono- or poly- cycloalkenol and preferably should be 10 to 25 percent greater and the reaction time should be sufficient to introduce oxirane oxygen at the site of each carbon to carbon double bond desired to be epoxidized. The preparation of tricyclo[5.2.1.0$^{2,6}$]dec-3-en-8(or 9)-ol, the percursor for 4-oxatetracyclo[6.2.1.-0$^{2,7}$.0$^{3,5}$]undecan-9(or 10)-ol, is effected by reacting dicyclopentadiene with an aqueous solution of an inorganic acidic catalyst, e.g., an aqueous solution of 25 weight percent sulfuric acid at an elevated temperature, e.g., from about 75° C., or lower, to about 125° C., and higher.

The novel unsaturated epoxides of this invention are the vinyl vic-epoxyalicyclic ethers, composed of carbon, hydrogen and oxygen, wherein said oxygen is in the form of etheric oxygen and oxirane oxygen and wherein the carbon atoms of the vic-epoxy group are in the alicyclic ring. The novel vinyl vic-epoxy ethers are represented by the formula $CH_2=CH-O-R$, wherein R represents a vic-epoxyalicyclic group. More specifically, R is (1) a vic-epoxycycloalkyl group, preferably containing 5 to 8 carbon atoms, wherein the vic-epoxy group is contained in the cycloalkyl ring and is connected to the ether oxygen of the above formula through at least one carbon atom; (2) a vic-epoxycycloalkylalkyl group having a vic-epoxycycloalkyl group as described above; (3) a 3-oxatricyclo-[3.2.1.0$^{2,4}$]oct-6-yl group; (4) a 3-oxatricyclo[3.2.1.0$^{2,4}$]oct-6-ylalkyl group; (5) a 4-oxatetracyclo[6.2.1.0$^{2,7}$.0$^{3,5}$]undec-9(or 10)-yl group; or (6) a 4-oxatetracyclo[6.2.1.-0$^{2,7}$.0$^{3,5}$]undec-9(or 10)-ylalkyl group. Specific illustrations of R include 2,3-epoxycyclopentyl, 4-methyl-2,3-epoxycyclopentyl, 4-isopropyl-2,3-epoxycyclopentyl, 3,4-epoxycyclohexyl, 3-ethyl-3,4-epoxycyclohexyl, 4-methyl-2,3-epoxycyclohexyl, 6-n-butyl-3,4-epoxycyclohexyl, 5-amyl-3,4-epoxycyclohexyl, 2,4-diethyl-3,4-epoxycyclohexyl, 3,4-epoxycycloheptyl, 2,3-epoxycycloheptyl, 2-ethyl-3,4-epoxycycloheptyl, 2,3-epoxycyclopentylmethyl, 3,4-epoxycyclohexylmethyl, 2-n-propyl-3,4-epoxycyclohexylmethyl, 5-ethyl-3,4-epoxycyclohexylpropyl, 3,4-epoxycyclohexylamyl, 2,3-epoxycycloheptylmethyl, 3-oxatricyclo-[3.2.1.0$^{2,4}$]oct-6-yl, lower alkyl substituted-3-oxatricyclo-[3.2.1.0$^{2,4}$]oct-6-yl, 4-oxatetracyclo[6.2.1.0$^{2,7}$.0$^{3,5}$]undec-9(or 10)-yl, lower alkyl substituted-4-oxatetracyclo[6.2.-1.0$^{2,7}$.0$^{3,5}$]undec-9(or 10)-yl, and the like.

The novel compounds produced by this invention include vinyl 2,3-epoxycyclopentyl ether, vinyl 4-methyl-2,3-epoxycyclopentyl ether, vinyl 4-isopropyl-2,3-epoxycyclopentyl ether, vinyl 3,4-epoxycyclohexyl ether, vinyl 3-ethyl-3,4-epoxycyclohexyl ether, vinyl 4-methyl-2,3-epoxycyclohexyl ether, vinyl 6-n-butyl-3,4-epoxycyclohexyl ether, vinyl 5-amyl-3,4-epoxycyclohexyl ether, vinyl 2,4-diethyl-3,4-epoxycyclohexyl ether, vinyl 3,4-epoxycycloheptyl ether, vinyl 2,3-epoxycycloheptyl ether, vinyl 2-ethyl-3,4-epoxycycloheptyl ether, vinyl 2,3-epoxycyclopentylmethyl ether, vinyl 3,4-epoxycyclohexylmethyl ether, vinyl 2-n-propyl-3,4-epoxycyclohexylmethyl ether, vinyl 5-ethyl-3,4-epoxycyclohexylpropyl ether, vinyl 3,4-epoxycyclohexylamyl ether, vinyl 2,3-epoxycyclooctyl ether, vinyl 3,4-epoxycycloheptylethyl ether, vinyl 3-oxatricyclo[3.2.1.0$^{2,4}$]oct-6-yl ether, vinyl lower alkyl substituted-3-oxatricyclo-[3.2.1.0$^{2,4}$]oct-6-yl ether, vinyl 4-oxatetracyclo[6.2.1.0$^{2,7}$.0$^{3,5}$]undec-9(or 10)-yl ether, vinyl lower alkyl substituted - 4 - oxatetracyclo[6.2.1.0$^{2,7}$.0$^{3,5}$]undec-9(or 10)-y ether, and the like.

The novel unsaturated epoxides of this invention can be self-polymerized through the vinyl group thereof or co-polymerized through the vinyl group thereof with other polymerizable olefinically unsaturated organic monomers to produce novel polymers which contain groups having the formula

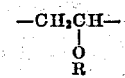

wherein R is as previously defined, with or without groups derivable from the polymerizable olefinically unsaturated compound, e.g., having the formula

wherein R' can be the same or different groups selected from the class consisting of hydrogen, alkyl, aryl, and the like. These polymers are obtained by employing vinyl polymerization catalysts such as benzoyl peroxide, t-butyl hydroperoxide, cumene hydroperoxide, acetyl peroxide, p-menthane hydroperoxide, lauroyl peroxide, di-t-butyl peroxide, t-butyl perbenzoate, and the like. Illustrative polymerizable olefinically unsaturated monomers include the heptenes, nonenes, ethylene, propylene, isobutylene, hexadiene, cyclopentene, cyclohexenes, styrene, divinylbenzene, divinyl ether, diallyl ether, methyl methacrylate, methyl acrylate, ethyl acrylate, maleic anhydride, maleic anhydride polyesters, acrylic acid, vinyl chloride, vinyl acetate, and the like. Such polymers comprise a chain of carbon atoms and pendant vic-epoxycycloalkoxy groups or vic-epoxypolycycloalkoxy groups, i.e., —or groups.

In addition, the novel unsaturated epoxides of this invention can be self-polymerized through their vic-epoxy groups or co-polymerized through their vic-epoxy groups with other vic-epoxy organic compounds, such as ethylene oxide, propylene oxide, dicyclopentadiene dioxide, divinylbenzene dioxide, vinylcyclohexene dioxide, butylene oxide, cyclohexene oxide, and the like. The polymerizations or co-polymerizations through the vic-epoxy groups is best conducted in the presence of basic catalysts at such temperatures as about 25° C. to about 250° C. Illustrations of suitable basic catalysts include the alkali metal hydroxides, organic amines, e.g., triethylamine, and the like.

In addition, the novel unsaturated epoxides of this invention can be polymerized through the vic-epoxy group with active organic hardeners, such as polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like, by mixing said epoxides with said hardener and maintaining the resulting mixture at a temperature from about 25° C. to 250° C. Other vic-epoxy organic compounds, as set forth above, can be added to the mixture of the novel vicinal unsaturated epoxides and organic hardener as desired. Basic catalysts, as described above, can also be employed to increase the rate of polymerization or decrease the polymerization temperature.

Polymers and/or co-polymers obtained by polymerizing the novel unsaturated epoxides through the vic-epoxy group thereof, with or without other vicinal-epoxy compounds and with or without organic hardeners contain groups of the formula

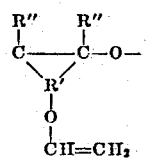

wherein R' is a trivalent saturated aliphatic hydrocarbon group or a trivalent saturated cycloaliphatic hydrocarbon group and wherein each R'' is a hydrogen or alkyl and wherein the novel unsaturated epoxide of this invention is represented by the formula

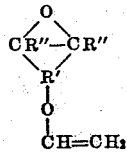

wherein R' and R'' are as described above and each need not be the same throughout the same polymer molecule. Such polymers and/or co-polymers contain pendant vinyl groups which are available for further cross-linking polymerization or co-polymerization with other polymerizable olefinically unsaturated organic monomers as described above.

Polymers and/or copolymers obtained by polymerizing the novel unsaturated epoxides through the epoxy groups and vinyl groups thereof with or without other vicinal-epoxy compounds, active organic hardeners, and/or polymerizable olefinically unsaturated organic compounds contain groups of the formula:

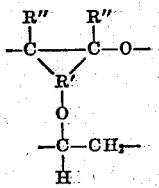

wherein R' and R'' are as defined above.

Preferably, R' in each of the above formulas is a trivalent alkane or alicyclic group having 3 to 6 carbon atoms in a chain connecting the R''-bonded carbon atoms, e.g.,

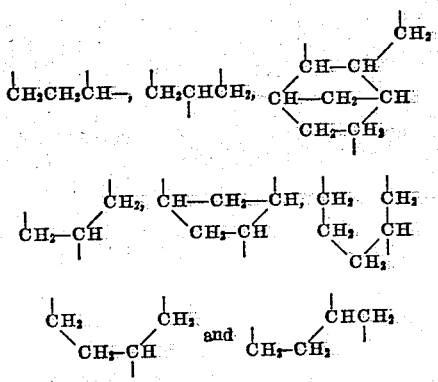

Representative active organic hardeners for admixture and/or reaction with the novel unsaturated epoxides include oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept - 5 - ene - 2,3 - dicarboxylic anhydride, methylbicyclo[2.2.1]hept - 2 - ene - 2,3 - dicarboxylic anhydride, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, polycarboxy polyesters prepared by known condensation procedures, employing mol ratios favoring greater than equivalent amounts of polycarboxylic acid or polycarboxylic acid anhydride, such as those listed above, with relation to the polyhydric alcohol, such as those listed above, and polyhydroxy polyesters prepared by known procedures, employing mol ratios favoring greater than equivalent amounts of polyhydric alcohol with relation to the polycarboxylic acid or anhydride.

The following examples are illustrative:

EXAMPLE 1

*Vinyl 9(10)-(4-oxatetracyclo[6.2.1.0$^{2,7}$.0$^{3,5}$]undecyl) ether*

Vinyl n-butyl ether (300 g.), 4-oxatetracyclo[6.2.1.0$^{2,7}$.0$^{3,5}$]undecane-9(or 10)-ol (82 g.) and mercuric acetate (2.5 g.) were charged to a one liter flask, and the resultant solution was refluxed at atmospheric pressure for six hours. The catalyst was then destroyed by the addition of anhydrous potassium carbonate (5 g.), and the volatiles were removed under reduced pressure. The residue was fractionated at reduced pressure to yield the product (29.7 g.: 31% yield based on charged 4-oxatetracyclo-[6.2.1.0$^{2,7}$.0$^{3,5}$]undecane-9(10) - ol). The vinyl 9(10)-4-oxatetracyclo[6.2.1.0$^{2,7}$.0$^{3,5}$]undecyl) ether thus obtained had the following physical properties: B.P. 106–114° C./3 mm.; n 30/D 1.5070–1.5079. A hearts cut (B.P. 112° C./3 mm.; n 30/D 1.5076) analyzed 101% pure by epoxide determination (hydrogen bromide method). The infrared spectrum was consistent with the assigned structure. Elemental analysis provided the following results:

Calc'd. for $C_{12}H_{16}O_2$: C, 74.97%; H, 8.39%. Found: C, 74.71%; H, 8.44%.

EXAMPLE 2

*Vinyl 2,3-epoxycyclopentyl ether*

(A) Vinyl n-butyl ether (1600 g.), 2,3-epoxycyclopentanol (400 g.), and mercuric acetate (24 g.) were charged to a five-liter flask, and the resultant solution was refluxed at atmospheric pressure for six hours. The catalyst was then destroyed by addition of anhydrous potassium carbonate (60 g.), and the reaction mixture was fractionated under reduced pressure. Sixty four grams of the desired product, vinyl 2,3-epoxycyclopentyl ether (B.P. 71° C./10 mm.–75° C./18 mm.) was collected before the pot residue polymerized. The infrared and mass spectra of a hearts cut (B.P. 71° C./10 mm.; n 30/D 1.4658) were consistent with the proposed structure. Elemental analysis provided the following results:

Calc'd. for $C_7H_{10}O_2$: C, 66.64%; H, 7.99%. Found: C, 66.87%; H, 8.27%.

(B) Vinyl n-butyl ether (1800 g.), 2,3-epoxycyclopentanol (300 g.), and mercuric acetate (15 g.) were charged to a five-liter flask, and the resultant solution was refluxed at atmospheric pressure for six hours. The catalyst was then destroyed by the addition of anhydrous potassium carbonate (30 g.). Distillation yielded a crude product (282 g.) boiling at 47° C./.65 mm.–33° C./.06 mm. This was dissolved in benzene (200 ml.), washed with water (5–50 ml. portions) to remove unreacted alcohol, and dried over anhydrous sodium sulfate. Redistillation gave the product (71.3 g., 19% yield based on charged 2,3-epoxycyclopentanol) with the following properties: B.P. 50° C./2.5 mm.; n 30/D 1.4665. A hearts cut analyzed 98.2% pure by epoxide determination (hydrogen bromide method).

EXAMPLE 3

*Vinyl 2,3-epoxypropyl ether*

Glycidol (319 g.), vinyl 2-ethylhexyl ether (675 g.), and mercuric acetate (22 g.) were charged to a two-liter flask fitted with an efficient fractionating column. The mixture was refluxed under reduced pressure (16 mm.) and the low boiling product was taken off slowly at the head. After a short period of time the two phase reaction mixture became homogeneous. The crude overhead product (221 g.) thus obtained was dissolved in benzene (500 ml.), washed with water (5–75 ml. portions) to remove unreacted glycidol, and dried over anhydrous sodium sulfate. Redistillation yielded vinyl 2,3-epoxypropyl ether (164 g.; 38% yield) having the following properties: B.P. 38.5° C./15.5 mm.; n 30/D 1.4300–1.4310. A hearts cut (B.P. 38.5° C./15.5 mm.; n 30/D 1.4301) analyzed 93% pure by epoxide determination (pyridine-hydrochloride method).

The infrared and mass spectra of vinyl 2,3-epoxypropyl ether, prepared as above, were consistent with the proposed structure. The mass spectrum indicated that the material contained trace to slight amounts of unidentified impurities. Elemental analysis provided the following results:

Calc'd. for $C_5H_8O_2$: C, 59.98%; H, 8.05%. Found: C, 60.47%; H, 8.20%.

EXAMPLE 4

*Vinyl 3-oxatricyclo[3.2.1.0$^{2,4}$]oct-6-yl ether*

Example 1 is followed with the exception that in place of 4-oxatetracyclo[6.2.1.0$^{2,7}$.0$^{3,5}$]undecane-9(10)-ol an equal molar amount of 3-oxatricyclo[3.2.1.0$^{2,4}$]octan-6-ol is employed. The resulting product is vinyl 3-oxatricyclo [3.2.1.0$^{2,4}$]oct-6-yl ether.

EXAMPLE 5

*Vinyl 5-oxapentacyclo[7.2.1.1$^{3,7}$.0$^{2,8}$.0$^{4,6}$]tridec-10-ylmethyl ether*

Example 2(A) is conducted with the exception that in place of 2,3-epoxycyclopentanol an equal molar amount of 5 - oxapentacyclo[7.2.1.1$^{3,7}$.0$^{2,8}$.0$^{4,6}$]tridec-10-ylmethanol is employed. The resulting product is vinyl 5-oxa-pentacyclo-[7.2.1.1$^{3,7}$.0$^{2,8}$.0$^{4,6}$]tridec-10-ylmethyl ether.

EXAMPLE 6

*Vinyl 3,4-epoxycyclohexyl ether*

Example 2(A) is conducted with the exception that in place of 2,3-epoxycyclopentanol an equal molar amount of 3,4-epoxycyclohexanol is employed. The resulting product is vinyl 3,4-epoxycyclohexyl ether.

EXAMPLE 7

*Vinyl 3-oxatricyclo[3.2.1.0$^{2,4}$]oct-6-ylmethyl ether*

Example 2(A) is followed with the exception that in place of 2,3-epoxycyclopentanol an equal molar amount of 3-oxatricyclo[3.2.1.0$^{2,4}$]oct-6-ylmethanol is employed. The resulting product is vinyl 3-oxatricyclo[3.2.1.0$^{2,4}$]oct-6-ylmethyl ether.

EXAMPLE 8

One mole of ethylene and one mole of vinyl 2,3-epoxycyclopentyl ether are mixed with a catalytic amount of benzoyl peroxide and heated to approximately 70° C. There is obtained a polymer having pendant 2,3-epoxycyclopentoxy groups.

EXAMPLE 9

One mole of vinyl 2,3-epoxypropyl ether and one mole of ethylene oxide are mixed with a catalytic amount of dibutyl zinc and heated. There results a polymer having vinyl unsaturation.

EXAMPLE 10

One mole of vinyl 3,4-epoxycyclohexyl ether and one mole of succinic acid are mixed and heated. There results a polymer having vinyl unsaturation.

EXAMPLE 11

One mole of vinyl 3-oxatricyclo[3.2.1.0$^{2,4}$]oct-6-yl ether is mixed with a catalytic amount of dibutyl zinc and heated. There results a polymer having vinyl unsaturation.

EXAMPLE 12

One mole of vinyl 5-oxapentacyclo[7.2.1.1$^{3,7}$.0$^{2,8}$.0$^{4,6}$]-tridec-10-ylmethyl ether is mixed with one mole of phthalic anhydride and the mixture is heated. There results a polymer having vinyl unsaturation.

EXAMPLE 13

One mole of vinyl 3-oxatricyclo[3.2.1.0$^{2,4}$]oct-6-yl-methyl ether is mixed with one mole of ethylene glycol and a catalytic amount of dibutyl zinc and the mixture is heated. There results a polymer having vinyl unsaturation.

EXAMPLE 14

One mole of vinyl 2,3-epoxycyclopentyl ether, one mole of ethylene diamine, one mole of styrene and a catalytic amount of di-t-butyl peroxide are mixed and the resulting mixture is heated. There results a solid polymer having groups of the formula:

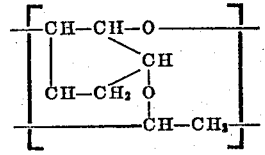

EXAMPLE 15

Vinyl acetate (340 grams), mercuric acetate (3 grams) and sulfuric acid (.05 gram) were placed in a flask and cooled to —20° C. 4-oxatetracyclo[6.2.1.0$^{2,7}$.0$^{3,5}$]undecan-9(10)-ol (166 grams) was then added dropwise over a period of one hour during which the temperature was maintained at —10 to —20° C. Sodium carbonate (63.6 grams) was then added to destroy the catalyst. The resultant mixture was filtered and the filtrate distilled. There was thus obtained vinyl 9(10)-(4-oxatetracyclo-[6.2.1.0$^{2,7}$.0$^{3,5}$]undecyl) ether (16 grams).

Reasonable variations and modifications of the invention can be made or carried out in the light of the above disclosure without departing from the spirit and scope thereof.

What is claimed is:

1. Vinyl 3-oxatricyclo[3.2.1.0$^{2,4}$]oct-6-yl ether.
2. Vinyl 3-oxatricyclo[3.2.1.0$^{2,4}$]oct-6-ylalkyl ether.
3. Vinyl 4 - oxatetracyclo[6.2.1.0$^{2,7}$.0$^{3,5}$]undec-9 - yl ether.
4. Vinyl 4-oxatetracyclo[6.2.1.0$^{2,7}$.0$^{3,5}$]undec-9-ylalkyl ether.
5. Vinyl vic-epoxycycloalkyl ethers of the formula:

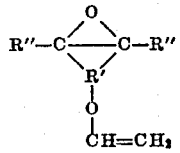

wherein R' is a trivalent saturated hydrocarbon group which together with the R'-bonded carbon atoms forms a member of the group consisting of saturated monocyclic and polycyclic rings, and wherein R" is selected from the group consisting of hydrogen and alkyl.

6. Vinyl vic-epoxycycloalkyl ethers of the formula:

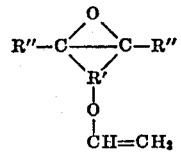

wherein R' is a trivalent saturated hydrocarbon group containing 3 to 8 carbon atoms which together with the R"-bonded carbon atoms forms a member of the group consisting of saturated monocyclic and polycyclic rings, and wherein R" is selected from the group consisting of hydrogen and alkyl.

7. A homopolymer containing pendant unreacted epoxy groups containing repeating units of the formula:

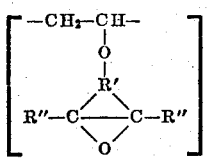

wherein R' is a trivalent saturated hydrocarbyl radical which together with the two R"-bonded carbon atoms forms a member of the group consisting of saturated monocyclic and polycyclic rings, and wherein each R" is individually selected from the group consisting of hydrogen and alkyl.

8. A homopolymer containing pendant unreacted epoxy groups containing repeating units of the formula:

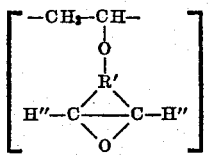

wherein R' is a trivalent saturated hydrocarbyl radical containing from 3 to 8 carbon atoms, which together with the two hydrogen-bonded carbon atoms form a member of the group consisting of saturated monocyclic or polycyclic rings.

9. A homopolymer having pendant vinyl groups containing repeating units of the formula:

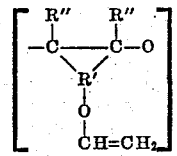

wherein R' is a trivalent saturated hydrocarbon group which together with the R"-bonded carbon atoms forms a member of the group consisting of saturated monocyclic and polycyclic rings, and wherein R" is selected from the group consisting of hydrogen and alkyl.

10. A homopolymer having pendant vinyl groups containing repeating units of the formula:

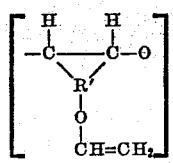

wherein R' is a trivalent saturated hydrocarbon group containing 3 to 8 carbon atoms which together with the R'-bonded carbon atoms forms a member of the group consisting of saturated monocyclic and polycyclic rings, and wherein R" is selected from the group consisting of hydrogen and alkyl.

11. A solid homopolymer having repeating units of the formula:

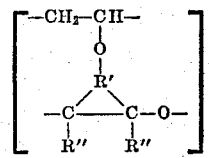

wherein R' is a trivalent saturated hydrocarbon group which together with the R"-bonded carbon atoms forms a member of the group consisting of saturated monocyclic and polycyclic rings, and wherein R" is selected from the group consisting of hydrogen and alkyl.

12. A copolymer having pendant vinyl groups obtained by copolymerizing through the epoxy groups a member selected from the group consisting of vinyl vic-epoxymonocycloalkyl ethers and vinyl vic-epoxypolycycloalkyl ethers wherein said monocycloalkyl and polycycloalkyl portions contain from 3 to 8 carbon atoms and a vicinal epoxy hydrocarbon.

13. The copolymer of claim 12 wherein the vicinal epoxy hydrocarbon is ethylene oxide.

14. A thermosetting solid copolymer obtained by crosslinking the copolymer of claim 12 through the vinyl groups.

15. A copolymer having pendant epoxy groups obtained by copolymerizing through the vinyl groups, a member selected from the group consisting of vinyl vic-epoxymonocycloalkyl ethers and vinyl vic-epoxypolycycloalkyl ethers wherein said monocycloalkyl and polycycloalkyl portions contain from 3 to 8 carbon atoms, and an olefinically unsaturated polymerizable monomer.

16. The copolymer of claim 11 wherein the said olefinically unsaturated monomer is ethylene.

17. The copolymer of claim 11 wherein the said olefinically unsaturated monomer is styrene.

18. A thermosetting copolymer obtained by crosslinking the copolymer of claim 15 through the epoxy groups.

References Cited by the Examiner

UNITED STATES PATENTS

| | | | |
|---|---|---|---|
| 2,698,308 | 12/54 | Crecelius | 260—348 |
| 2,760,990 | 8/56 | Watanabe et al. | 260—614 |
| 2,847,478 | 8/58 | Hwa et al. | 260—611 |
| 2,889,339 | 6/59 | Levy et al. | 260—348 |
| 3,014,048 | 12/61 | Tinsley et al. | 260—348 |
| 3,065,213 | 11/62 | Vandenberg | 260—88.3 |

JOSEPH L. SCHOFER, *Primary Examiner.*
WILLIAM H. SHORT, *Examiner.*